Aug. 31, 1948.                    P. LA POINTE                    2,448,446
                          VERTICAL AIR CURRENT TYPE
                          POTATO SEPARATING MACHINE
                              Filed Dec. 7, 1945
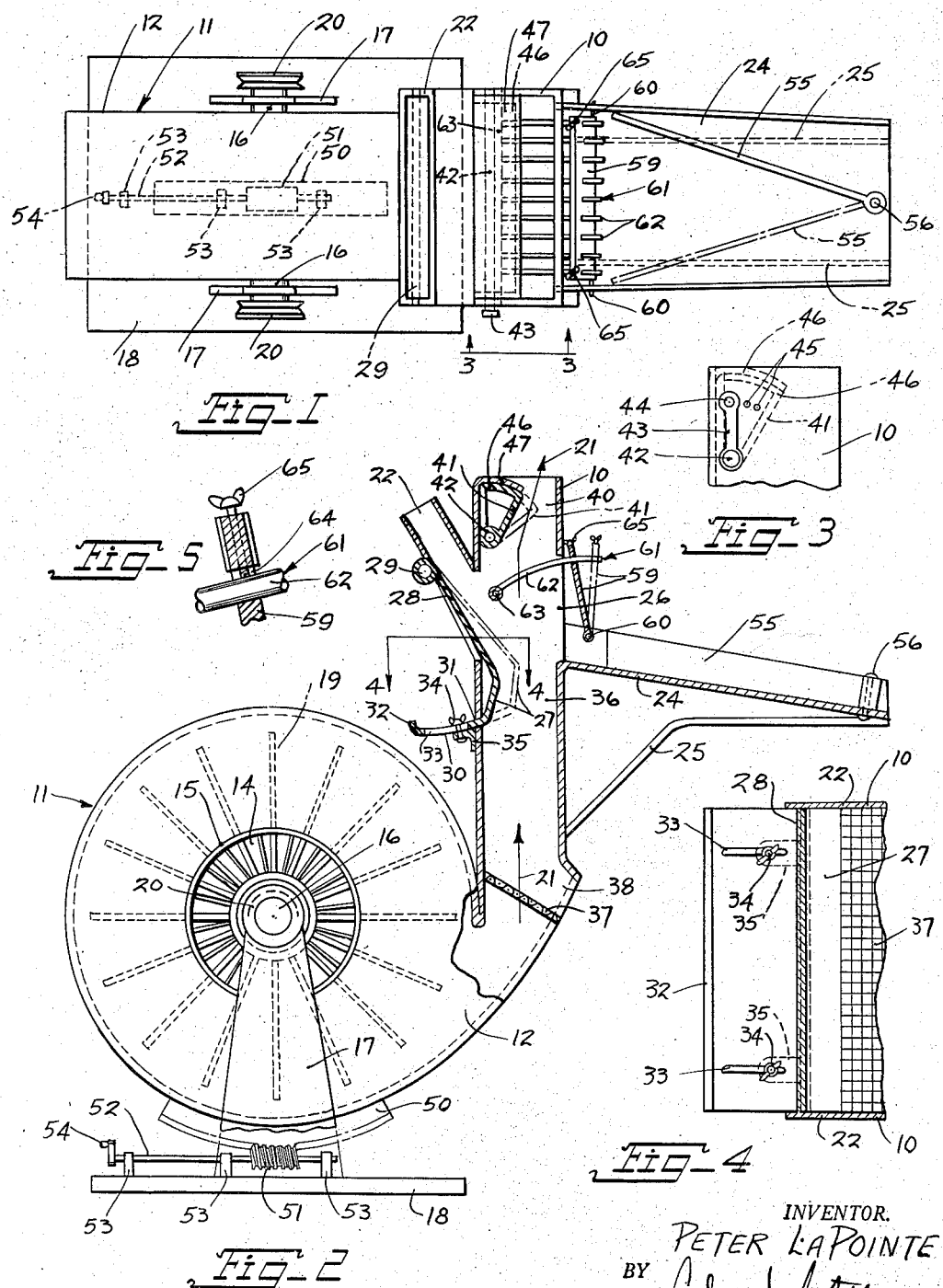
INVENTOR.
PETER LaPOINTE
BY
Edward [signature]
ATTORNEY.

Patented Aug. 31, 1948

2,448,446

UNITED STATES PATENT OFFICE 2,448,446

VERTICAL AIR CURRENT TYPE POTATO SEPARATING MACHINE

Peter La Pointe, Brooklyn, N. Y.

Application December 7, 1945, Serial No. 633,504

2 Claims. (Cl. 209—139)

This invention relates to new and useful improvements in a potato separating machine.

The new and improved potato separating machine is particularly intended for use on farms. It is proposed to be used in conjunction with a potato digger and it is for the purpose of separating rocks, leaves and dirt from the potatoes.

The characteristic feature of the new potato separating machine resides in the fact that it includes a substantially vertical air discharge conduit which is provided with a baffle assisting in forming a constriction within the conduit and located in the vicinity of a discharge rack for the potatoes, to increase the velocity of the passing air for floating the potatoes and deflecting and streaming them onto the potato discharge rack. It is proposed that a centrifugal-fan provide the necessary current of air which is passed upwards through the conduit. This fan may be driven with a gasoline motor, or any other convenient drive.

The invention contemplates the use of a chute connected with the side of the conduit through which the potatoes and rocks and dirt as received from the potato digger may be supplied to the conduit. It is also proposed to provide a grille-like discharge within the conduit beneath the said constriction for discharging rocks and heavy particles falling through the orifice. It is also proposed to provide the discharge conduit with a top orifice at a point above the said constriction for the discharge of leaves, dirt and other light foreign materials.

Another object of this invention is to provide a simple effective means by which the conduit may be tilted so that it may be maintained in a vertical position at all times irrespective of the inclination of the tractor, or potato digger, or other vehicle upon which the potato separating machine is mounted and towed about. With this arrangement it is possible to compensate for hills. It is possible to maintain the discharge conduit in a vertical position for the correct and proper operation of the potato separating machine.

Another object of the invention is to associate the baffle which forms said constriction, with means by which it may be adjusted for controlling the size of the constriction, and it is proposed to so shape the baffle to cause deflection of the potatoes, for assisting in streaming the potatoes onto the discharge rack.

Another object of this invention is to provide the top orifice with a baffle by which it may be adjusted for assisting in controlling the air passage through the air discharge conduit.

Another object of this invention resides in the provision of a gate upon the discharge rack, by which the stream of separated potatoes may be controlled so that first one sack or container may be filled and then the other sack or container may be filled, without stopping the operation of the potato separating machine.

The invention furthermore proposes a new and improved potato separating machine embodying the various features pointed out above which is simple in construction, reliable in operation and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a plan view of a potato separating machine constructed in accordance with this invention.

Fig. 2 is a front elevational view of the machine shown in Fig. 1, with certain parts broken away to disclose the interior construction.

Fig. 3 is a fragmentary elevational view looking in the direction of the line 3—3 of Fig. 1.

Fig. 4 is a fragmentary enlarged horizontal sectional view taken on the line 4—4 of Fig. 2.

Fig. 5 is a fragmentary enlarged detailed view of a portion of Fig. 2.

The potato separating machine in accordance with this invention includes a substantial vertical air discharge conduit 10. This conduit is associated with means for driving an air stream upwards through it. This means is characterized by a centrifugal fan 11 which includes a spiral fan casing 12 connecting with the conduit 10.

The spiral fan casing 12 is provided with an axial side opening 14 on each side through which the air may enter the casing. The spiral fan casing 12 is turnably axially supported by a spoke or spider wheel-like member 15 mounted upon each of the sides and freely mounted upon a horizontal shaft 16. This shaft 16 is turnably supported on a pair of side standards 17 which are mounted upon a support base 18. The centrifugal fan 11 is provided with a fan wheel 19 which is fixedly mounted upon the shaft 16. The shaft 16 is provided with pulleys 20 which are intended to be connected by a belt, or other endless members with a gasoline motor, or other drive mechanism. When the centrifugal fan wheel 19 is driven the air will be discharged upwards through the conduit 10 as schematically illustrated by the arrows 21 in Fig. 2.

A chute 22 connects with the side of the conduit 10 and is for the purpose of supplying potatoes and dirt as received from a potato digger to the conduit 10. This chute 22 extends obliquely downwardly so that the potatoes, rocks and dirt will fall downwards into the conduit. A discharge rack 24 connects with the side of the conduit 10 and is for the purpose of receiving the separated potatoes. This rack 24 is inclined downwardly so that the potatoes will discharge off of it and into a receiving container, or bag. The rack 24 is supported by braces 25. The side of the conduit 10 is provided with an opening 26 through which the potatoes may pass when they enter upon the rack 24. A baffle 27 is associated with the interior of the conduit 10 in the vicinity of the discharge rack 24 for forming a constricted area 36 for increasing the velocity of the air passing upwards through the conduit 10 for floating the potatoes and for deflecting and streaming them onto the discharge rack 24.

The baffle 27 extends upwards into the chute 22. The upper end 28 of the baffle 27 forms a portion of the bottom of the chute 22. This top end 28 is pivotally connected with the chute 22 by a hinge 29. The sides of the top portion of the baffle engage against the inner side faces of the chute 22. The baffle 27 has a bottom end 30 which is curved concentric with the hinge 29. This bottom end 30 passes out through a slot 31 formed in the side of the conduit 10. The edge portion 32 of the bottom end 30 is turned upwards so that it may be easily gripped like a handle. The bottom portion 30 of the baffle 27 is formed with several slots 33 through which clamp screws 34 pass. These clamp screws 34 are mounted upon brackets 35 which are mounted on the outside of the conduit 10. The clamp screws 34 may be loosened and then the bottom end 30 of the baffle 27 may be moved for pivoting the baffle 27 to various positions. One of these positions is indicated by the dot and dash lines 27 in Fig. 2. In this way, the size of the constricted area 36 may be controlled. This control is necessary for properly floating the potatoes, and for deflecting them onto the discharge rack 24.

A grille-like discharge 37 is mounted within the conduit 10 beneath said baffle 27 and the constricted area 36. The discharge grille 37 connects with a discharge opening 38 through which the rocks and heavy articles falling through the constricted area 36 will discharge. The grille-like discharge 37 is inclined so that the rocks and heavy particles will fall downwards by gravity. The air current from the centrifugal fan 11 passes upwards through the grille-like discharge 37.

The conduit 10 is also provided with a top orifice 40. This top orifice 40 is partly formed by an adjustable baffle 41. The top orifice 40 is located at a point above the baffle 27 and is for the purpose of discharging leaves, dirt and other light foreign materials. The baffle 41 is mounted upon a pintle rod 42 which is turnably mounted across the conduit 10. One end of the pintle rod 42 extends through the side of the conduit 10. This end is provided with a lever 43. A pin 44 is mounted upon the top of the lever 43 and is cooperative with several niches 45, by which the baffle 41 may be held in adjusted turned positions. One of these positions is indicated by dot and dash lines in Fig. 2. The baffle 41 is provided with a top flange 46 which is concentric with the pintle rod 42. This flange 46 engages against a top flange 47 formed on or mounted on one side of the top of the conduit 10.

The conduit 10 is associated with means by which it is adjustably supported so that it may be directed vertically upwards irrespective of the fact that the potato separating machine may be on a tractor or other conveyance which is inclined because it is on a hill. More specifically, the fan casing 12 is provided with an arcuate rack 50 which is concentric with the shaft 16. This rack 50 is engaged by a worm pinion 51 mounted on a shaft 52 which is rotatively supported in bearings 53 mounted on the base 18. The shaft 52 is provided with a handle 54 by which it may be conveniently turned. The handle 54 may be turned in one direction, or the other so as to turn the centrifugal fan 11 in one direction, or the other, and correspondingly change the tilt of the conduit 10.

The discharge rack 24 is provided with a gate 55 by which the stream of potatoes may be controlled. This gate 55 has its outer end pivotally supported on a vertical pintle 56. This pintle 56 is located centrally of the discharge rack 24. When the gate 55 is in a position as illustrated by the full lines in Fig. 1, the potatoes will be streamed to one half of the discharge rack 24. A potato receiving bag may be placed beneath this half of the rack. When this bag or receptacle is full, the gate 55 may be swung to its second position, the one indicated by the dot and dash lines in Fig. 1. Now the potatoes will be streamed to the other half of the rack 24 so that they will discharge into a second receiving receptacle, or bag. In this way it is possible to continuously operate the potato separating machine while the containers or bags are changed.

Some of the air passing through the conduit 10 will discharge through the opening 26 producing a lateral draft to assist in streaming the potatoes onto the discharge rack 24. A baffle 59 controls this lateral draft. The baffle 59 is pivotally supported by a trunnion 60 connected with the sides of the rack 24. A grill baffle 61 which includes a plurality of spaced arcuate rods 62, is pivotally mounted upon an axis 63 disposed across the conduit 10. The rods 62 extend through openings 64 formed in the baffle 59. Several set screws 65 are mounted on the baffle 59 and abut the rods 62 for holding the baffle 59 in selected pivoted positions for controlling said lateral draft. A wide open position for the baffle 59 is schematically illustrated by the dot and dash lines 59 in Fig. 2. The grill baffle 62 allows free passage of air upwards through the conduit 10, but arrests upward passage of potatoes and assists in deflecting stray potatoes down and into the lateral draft so that they stream onto the rack 24. Dirt and leaves may pass through the grille baffle 61.

The operation of the potato separating machine may be understood from the following:

The centrifugal fan 11 is turned on so as to supply a stream of air upwards through the conduit 10. The potatoes, rocks and dirt as received from the digger are discharged into the chute 22. At the vicinity of the constricted area 36 the potatoes will be floated by the upstream of air. They will also be deflected by the top portion 28 of the baffle 27 and by the draft through opening 26 so as to stream upon the discharge rack 24. The rocks and heavy particles will fall down through the constricted area 36 and will be discharged by the grille-like discharge 37. The leaves, dirt and other light particles will be carried upwards by the stream of air and will be discharged through the orifice 40.

The fan 11 may be operated at a suitable rate of speed to provide a suitable stream of air through the conduit 10, to properly float the potatoes while allowing the rocks and heavy articles to fall downwards. The speed of the fan 11 may be varied by changing the speed of its drive, not shown on the drawing. The velocity of the air current passing through the constricted area 36 may be adjusted by adjusting the baffle 27 to increase or decrease the size of the area. The orifice 40 may also be controlled by changing the position of the baffle 41.

It is necessary that the discharge conduit 10 be in a vertical or nearly vertical position for the proper operation of the potato separating machine. Otherwise, the potatoes will not approach the constricted area 36 in a suitable manner. A vertical position of the conduit 10 may be maintained, by turning the handle 54 so as to turn the centrifugal fan housing 12 on the shaft 16 to indirectly control the tilt of the conduit 10.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a potato separating machine, a substantially vertical air discharge conduit having side openings on opposed sides, means for driving a current of air upwards through said conduit, a chute for supplying potatoes and dirt as received from a potato digger and connected with one of said side openings and extending obliquely downwards for discharging downwards and obliquely into said air discharge conduit, a first baffle obliquely from the bottom portion of said chute into said conduit and having a top portion hingedly connected with said chute and forming a slide for said potatoes and dirt and having a bottom portion constricting said conduit for increasing the air velocity at this area and inclined to direct some of the air passing through said conduit to the other of said side openings, means for holding said baffle in various hinged positions for varying the oblique direction of said baffle and for varying the constriction of said conduit, a discharge rack for separated potatoes connected with the last mentioned of said side openings, a second baffle across the last mentioned of said side openings and above said discharge rack for controlling the lateral draft through said last mentioned side opening, means for adjusting said second named baffle, and a grille baffle extending across said conduit and towards and connected with said second named baffle.

2. In a potato separating machine, a substantially vertical air discharge conduit having side opening on opposed sides, means for driving a current of air upwards through said conduit, a chute for supplying potatoes and dirt as received from a potato digger and connected with one of said side openings and extending obliquely downwards for discharging downwards and obliquely into said air discharge conduit, a first baffle extending obliquely from the bottom portion of said chute into said conduit and having a top portion hingedly connected with said chute and forming a slide for said potatoes and dirt and having a bottom portion constricting said conduit for increasing the air velocity at this area and inclined to direct some of the air passing through said conduit to the other of said side openings, means for holding said baffle in various hinged positions for varying the oblique direction of said baffle and for varying the constriction of said conduit, a discharge rack for separated potatoes connected with the last mentioned of said side openings, a second baffle across the last mentioned of said side openings and above said discharge rack for controlling the lateral draft through said last mentioned side opening, means for adjusting said second named baffle, and a grille baffle extending across said conduit and towards and connected with said second named baffle, said grille baffle including a plurality of rods extending through openings in said second named baffle.

PETER LA POINTE.

REFERENCES CITED

The following references are of record in the file of this patent:

UNITED STATES PATENTS

| Number | Name | Date |
|---|---|---|
| 8,033 | Booth | Apr. 8, 1851 |
| 186,578 | Kendrick et al. | Jan. 23, 1877 |
| 1,222,003 | Lannin | Apr. 10, 1917 |
| 1,549,102 | Arpin | Aug. 11, 1925 |
| 1,597,261 | Bishop | Aug. 24, 1926 |
| 1,663,257 | MacKenzie | Mar. 20, 1928 |
| 1,923,977 | Hewitt | Aug. 22, 1933 |
| 2,130,880 | Durning | Sept. 20, 1938 |
| 2,162,392 | Solomon | June 13, 1939 |

FOREIGN PATENTS

| Number | Country | Date |
|---|---|---|
| 700,354 | France | Dec. 23, 1930 |
| 111,446 | Germany | July 5, 1900 |